US012582934B2

(12) United States Patent
Sarigül

(10) Patent No.: US 12,582,934 B2
(45) Date of Patent: Mar. 24, 2026

(54) SMART DUST SUPPRESSION SYSTEM THAT SPRAYS ATOMIZED WATER THROUGH A FAN

(71) Applicant: Enveks Toz Kontrol Teknolojileri Sanayi Ve Ticaret Anonim Sirketi, Sincan (TR)

(72) Inventor: Hasan Sarigül, Çankaya (TR)

( * ) Notice: Subject to any disclaimer, the term of this patent is extended or adjusted under 35 U.S.C. 154(b) by 293 days.

(21) Appl. No.: 18/549,131

(22) PCT Filed: Mar. 9, 2021

(86) PCT No.: PCT/TR2021/050208
§ 371 (c)(1),
(2) Date: Sep. 5, 2023

(87) PCT Pub. No.: WO2022/191788
PCT Pub. Date: Sep. 15, 2022

(65) Prior Publication Data
US 2024/0139668 A1     May 2, 2024

(51) Int. Cl.
*B01D 47/06*       (2006.01)
*B01F 23/21*       (2022.01)
(Continued)

(52) U.S. Cl.
CPC .......... *B01D 47/06* (2013.01); *B01F 23/2132* (2022.01); *B01F 23/21321* (2022.01); *E21F 5/02* (2013.01)

(58) Field of Classification Search
CPC . B01F 23/21; B01F 23/2132; B01F 23/21321
See application file for complete search history.

(56) References Cited

U.S. PATENT DOCUMENTS 7,730,649 B1 * 6/2010 Currey ................... E02F 3/401
37/444

FOREIGN PATENT DOCUMENTS

CN        204491229 U      7/2015
CN        207003345 U      2/2018
(Continued)

OTHER PUBLICATIONS

International Search Report for corresponding PCT/TR2021/050208 dated Jan. 7, 2022.
(Continued)

*Primary Examiner* — Robert A Hopkins
(74) *Attorney, Agent, or Firm* — EGBERT, MCDANIEL & SWARTZ, PLLC

(57)              ABSTRACT

Disclosed is a smart dust suppression system that sprays atomized water through a fan that ensures the dust raised during collection, transport and discharge to be suppressed at the point where it starts to form without spreading to the environment, in enterprises such as cement factories, iron and steel factories, coal enterprises, thermal power plants, ports and the like, in machines that ensure the stockpiling of raw materials and the recovery of the stocked raw materials in all open and closed mine sites, in clamshell and conveyor belt systems, thereby preventing environmental pollution, protecting human health, preventing machinery and equipment from being affected by dust, and suppressing the dust emitted by the conveyor belts and the clamps during the unloading of the raw material.

10 Claims, 3 Drawing Sheets

(51) Int. Cl.
    *B01F 23/213*      (2022.01)
    *E21F 5/02*        (2006.01)

(56)          References Cited

FOREIGN PATENT DOCUMENTS

| | | | | |
|---|---|---|---|---|
| CN | 209510375 | U | | 10/2019 |
| CN | 209696544 | U | | 11/2019 |
| CN | 210206279 | U | * | 3/2020 |
| CN | 211585809 | U | | 9/2020 |
| KR | 101247180 | B1 | * | 3/2013   .......... B05B 3/1035 |

OTHER PUBLICATIONS

Written Opinion of the International Searching Authority for corresponding PCT/TR2021/050208 dated Jan. 7, 2022.

* cited by examiner

1

SMART DUST SUPPRESSION SYSTEM THAT SPRAYS ATOMIZED WATER THROUGH A FAN

TECHNICAL FIELD OF THE INVENTION

The present invention relates to a smart dust suppression system that sprays atomized water through a fan, which ensures that the dust raised during collection, transport and discharge to be suppressed at the point where it is formed without spreading to the environment in enterprises such as cement factories, iron and steel factories, coal enterprises, thermal power plants, ports and the like, in machines that ensure the stacking of raw materials and the recovery of the stacked raw materials in all open and closed mine sites, in clamshell and conveyor belt systems, thereby prevents environmental pollution, protects human health, prevents machinery and equipment from being affected by dust, suppresses the dust emitted by the conveyor belts and the clamps during the unloading of the raw material by automatically or manually adjusting the spray angle according to the pouring height of the raw material, by spraying atomized water to the first point of the dust, without spreading the same to the environment and sprays atomized water with fan.

STATE OF THE ART

In the state of the art, the dust suppression systems used to suppress dust that is raised when collecting, transporting, and discharging in machines that enable the stack of raw materials in the mine sites and the recovery of the stacked raw materials, in clamshell and conveyor belt systems, try to control dust by means of spraying after the dust is spread to the environment with single or double fluid nozzles or with atomized water systems with a fan placed on the platform sequentially along the length of the stack yard where the raw material is stored, collected, or close to the area where the dust problem occurs. Among these systems, nozzles that are used in single and double fluid systems do not have a very long spraying range, since they do not suppress the dust of the spilled raw material during spilling from an elevated point; they are not preferred in stacker and reclaimer applications. Although said systems are preferred, they cannot suppress the dust at the desired international rates.

In the state of the art, in enterprises such as cement factories, iron and steel factories, mine stackpiles, thermal power plants, ports, etc., for stacked raw materials in open or closed areas, stacker systems, reclaimer systems are used to collect the raw material from the stock stack area and send the same to the process, bunkers loaded with the clampshell bucket, and clamshell bucket cranes, and to load the raw material into carrier vehicles such as trucks and wagons.

Once the systems used during stacking, collection, loading, and transportation of raw materials begin operating, the raw material begins moving, thereby forming and raising dust. The movement of the raw material occurs by taking the raw material from one place, transferring the same, and leaving the same to another. Various systems are used during receiving, transferring, and releasing processes of raw materials, and every time the raw material moves, there is a risk of dust formation.

The dust suppression systems and equipment in the state of the art that are used for suppressing the dust formed in enterprises and areas where there is the risk of dust formation, serve for controlling the dust after it spreads to the environment. Said systems are used only when the raw materials are being received and released, and cannot be programmed according to the amount of raw material and dust, the first point where the dust begins spreading to the environment, and the volume of the dust. In this case, the formed dust cannot be suppressed sufficiently, and the negative effects of the dust cannot be eliminated in its entirety. Moreover, dust reduction systems and equipment used in the state of the art require constant human intervention due to the change of location and volume of the raw material.

OBJECTS OF THE INVENTION

The present invention aims to minimize the risk of dust formation by keeping the raw material under constant control and areas where the raw material moves during the processes of receiving raw materials, transferring and placing them with various systems in enterprises and in areas where there is a risk of dust formation, and thus aims to prevent environmental pollution, to protect human health, and to prevent machinery and equipment from being affected by dust.

Moreover, the present invention can control dust not only in one part of the worksite but in the entire area since the invention is applicable to all systems used for the transport/transfer of raw materials and is capable of adjusting its position according to the changing volume of the raw material and the first point where the dust begins to dissipate.

Furthermore, the present invention can supply uninterrupted water with an automatic hose reel so as to prevent any shortage during dust control, or water supply can be provided with an external water tank to be mounted on movable systems.

Moreover, the invention can adjust the fan airflow, water flow, and pressure based on the water spraying range, regarding to dust formation rate, material capacity and pouring height of the raw material.

DESCRIPTION OF THE REFERENCES IN THE FIGURES

Figure 1:
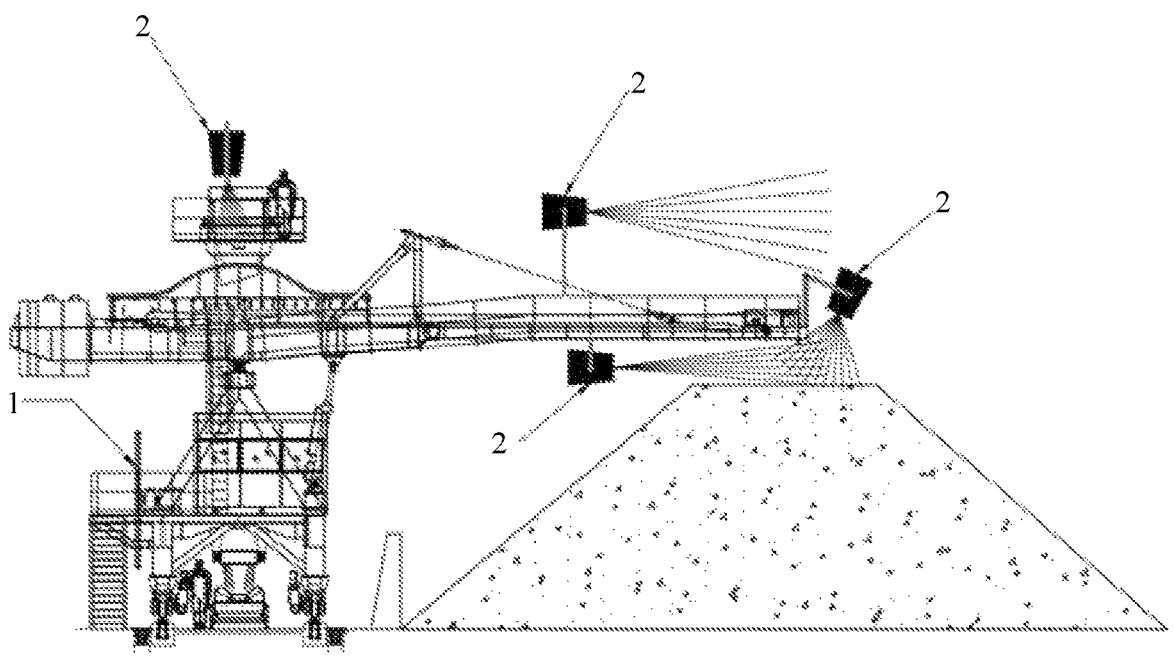
FIG. 1 illustrates the view of the manner in which the present invention is applied to the lineer stacker system.

The equivalents of the reference numbers shown in the figures are given below.

1. Automatic Hose Reel
2. Atomized Water Spraying Fan

DESCRIPTION OF THE INVENTION

The inventive smart dust suppression system that sprays atomized water with the fan consists of two basic components: an automatic hose reel (1) or an external water tank, and an atomized water spraying fan (2).

Atomized water spraying fan (2) suppresses the dust at its source by spraying water mist to the dust generated by the movement of the raw material or by the wind at points where the raw material is taken, transferred from one point to another point on the belt and left/poured/stacked. The automatic hose reel (1) automatically opens and collects the supply hoses and provides continuous water to the atomized water spraying fan (2). Thus, there is no need for a water tank and resupplying said water tank with water. Moreover, in another embodiment of the present invention, an external water tank that is mounted on moving systems where the present invention is to be applied and supplies water to the atomized water spraying fan (2) can be used instead of the automatic hose reel (1).

The atomized water spraying fan (2) has a movement sensor that calculates the pouring height of the raw material during the pouring of the raw material into the stack. Said movement sensor calculates the pouring height of the raw material in order to suppress the dust that comes out during the pouring of the raw material into the stack in the best way possible and allows the atomized water spraying fan (2), which moves up-down and left-right according to constantly changing height, to precisely target the section where the dust comes out.

The position of the atomized water spraying fan (2) can be adjusted both manually and automatically by means of the movement sensor.

The atomized water spraying fan (2) has another material sensor that detects whether there is a raw material on the belt on which the raw material is transferred. Dust is formed again while the raw material is transferred from one point. When there is raw material on the belt, said material sensor activates the atomized water spraying fan (2) and suppresses the dust, when there is no raw material on the belt, it turns off the atomized water spraying fan (2) and prevents it from running idle. The fan spraying systems mounted on the conveyor belts on the stacking and reclaiming machines due to high current draw of the drive drum when there is material on the belt with the flow circuit automation operating with the flow information received from the drive drum motor feed phase is activated and are deactivated due to low current draw when there is no material on the conveyor belt.

Atomized water spraying fan (2) has a fan speed control system. The fan speed control system adjusts the airflow rate of the atomized water spraying fan (2) according to the property of water spraying distance of the atomized water spraying fan (2) and dusting of the material. The fan speed control system allows the spraying distance setting to be the most effective distance setting according to the area where the dust comes out.

Water flow rate and pressure can be adjusted with the speed control system and water regulator on the water pump connected to the atomized water spraying fan (2).

The present invention can be used in all enterprises and fields where there is a risk of dust formation. The present invention is applicable to all points where the raw material having dust formation risk is transferred, of all systems such as stacker systems used for stacked raw materials in open or closed areas, reclaimer systems used to collect the raw material from the stack area and send it to the process, bunkers loaded with the clampshell bucket and clamshell bucket cranes, etc. used to load the raw material on carrier vehicles such as trucks and wagons. Therefore, dust is taken under control in all regions where there is a risk of dust formation, and all negative effects caused by dust are minimized.

Examples of the application methods of the smart dust suppression system that makes atomized water spraying with fan subject to registration to different systems are as follows.

Lineer Stacker System (Type 1): In the Lineer Stacker System (Type 1) shown in detail in FIG. 1, atomized water spraying fan (2) is mounted at the transfer and pouring points of the raw material on the conveyor belt. Atomized water spraying fan (2) located under the boom of the moving conveyor belt stacker system (type 1), targets the section where the dust comes out by moving up-down and left-right according to the pouring height of the material so as to suppress the dust that comes out during the pouring of the material into the stack. The up-down and right-left movement of the atomized water spraying fan (2) located under the boom, fan spraying distance according to the movement angle, and the pouring height of the raw material (electric motor speed control) can be adjusted automatically or manually by means of a sensor, software or logic control. Therefore, the spraying can be adjusted according to the section where the dust comes out.

The atomized water spraying fan (2) under the boom is for supporting purposes during the pouring of the atomized water spraying fan (2) on the boom end spill point on the Lineer Stacker System (Type 1), it ensures to suppress the dust while the raw material is poured on the stack. The up-down and right-left movement angle of the atomized water spraying fan (2) located on the boom, can be adjusted automatically or manually by means of a sensor, software, or logic control that adjust the fan spraying distance (electric motor speed control) according to the pouring height of the raw material. Therefore, the spraying can be adjusted according to the section where the dust comes out.

The atomized water spraying fan (2) on the top and in the middle portion of the boom on the Lineer Stacker System (Type 1) is used to suppress the dust generated by the wind in the stack area. The top of the stack area is moistened, and the dust caused by the wind is prevented by the up-down and left-right movement of the atomized water spraying fan (2). The atomized water spraying fan (2) located at the transfer point from the belt feeding the boom belt to the belt on the Lineer Stacker System (Type 1) provides suppressing the dust that occurs when the material is poured on the boom belt. All atomized water spraying fans (2) on the Lineer Stacker System (Type 1) can operate both automatically and manually by moving up-down and left-right and can also operate in one direction according to the operation.

The water need of all atomized water spraying fans (2) on the Lineer Stacker System (Type 1) are met by the automatic hose reel (1) that provides continuous water to the atomized water spraying fan (2) by automatically opening and collecting the supply hoses installed on the system or an external water tank.

Figure 2:
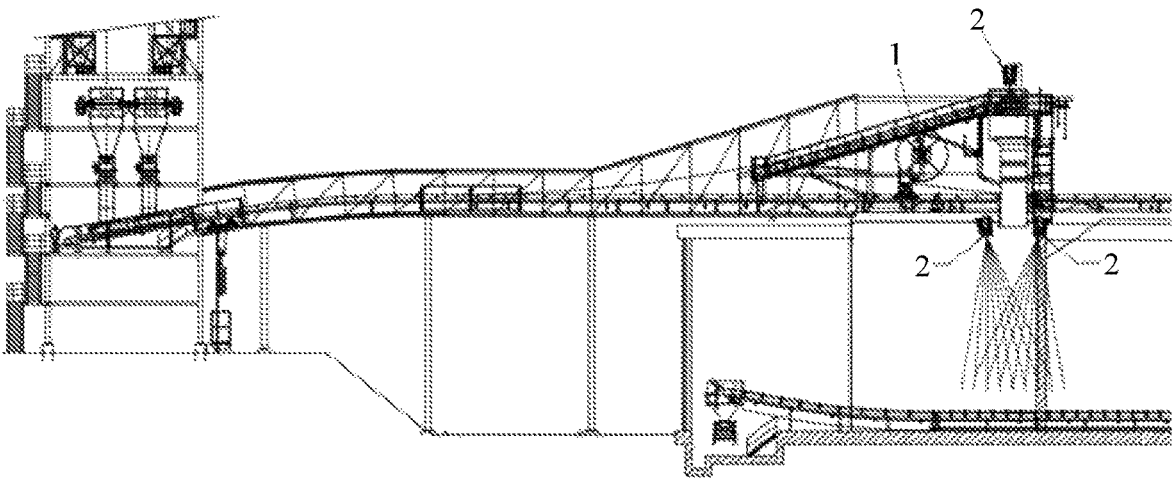
FIG. 2 illustrates the view of the manner in which the present invention is applied to tripper car.

Tripper Car System (Type 2): In the tripper car system (Type 2) shown in detail in FIG. 2, atomized water spray fans (2) are mounted on the transfer point on the moving belt and the belt transfer point and discharge chutes so as to suppress the dust that comes out during pouring into the stack. All atomized water-sprayed fans (2) on the tripper car system (Type 2) can move up-down and left-right, also they can perform spraying in one direction depending on the operation. In tripper car system (Type 2), the atomized water spraying fan (2) located under the conveyor belt discharge chute aims to suppress the dust that comes out during pouring into the stock, the up-down and right-left movement of the material according to the pouring height, fan spraying distance according to the movement angle and the pouring height of the raw material (electric motor speed control) can be adjusted automatically or manually by means of a sensor, software or logic control. Therefore, the spraying can be adjusted according to the section where the dust comes out.

The water need of all atomized water spraying fans (2) on the tripper car system (Type 2) is met by the automatic hose reel (1) that provides continuous water to the atomized water spraying fan (2) by automatically opening and collecting the supply hoses installed on the system or an external water tank.

Figure 3:
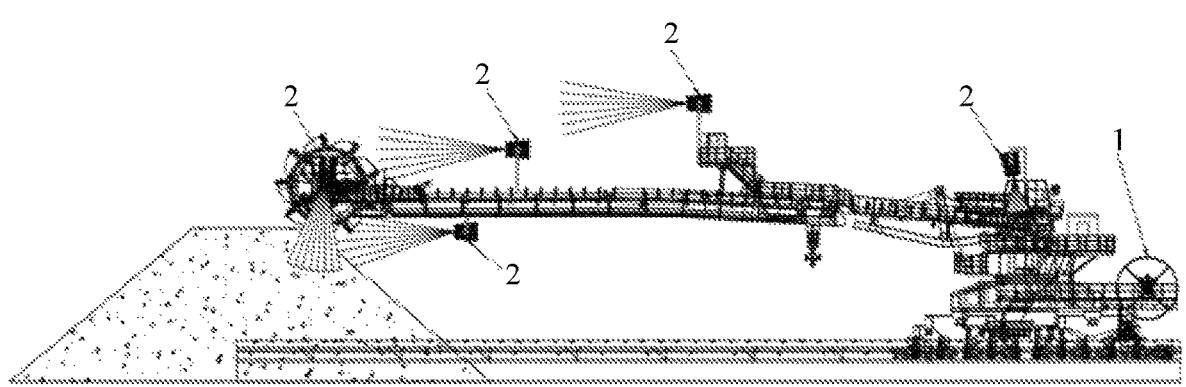
FIG. 3 illustrates the view of the application of the present invention to the raw material reclaimer system.

Raw Material Reclaimer System: An atomized water spraying fan (2) is assembled so as to suppress the dust that comes out in these systems whose detailed view is shown in FIG. 3. In the raw material reclaimer system, while the atomized water spray fan (2) mounted on the boom ensures that the raw material is taken from the stack with buckets and the dust released during the pouring into the conveyor belt is suppressed, on the other hand, other atomized water spraying fans (2) ensure that the dust that will be formed by the wind on the bulk material in the stack is suppressed, the dust coming out of the first transfer point is suppressed during the material retrieval of the buckets from the stack and after the material taken from the stack with the buckets is taken to the conveyor belt.

The atomized water spray distance of fans and the fan airflow rate according to the dusting feature of the material can be adjusted by means of the speed control system located on the atomized water spraying fans (2) located above and below the system in raw material reclaimer systems. The fan speed control system allows the spraying distance setting to be the most effective distance setting according to the area where the dust comes out. Water flow rate and pressure can be adjusted with the speed control system and water regulator on the water pump.

The water need of all atomized water spraying fans (2) on the raw material reclaimer system are met by the automatic hose reel (1) that provides continuous water to the atomized water spraying fan (2) by automatically opening and collecting the supply hoses installed on the system or an external water tank.

Figure 4:
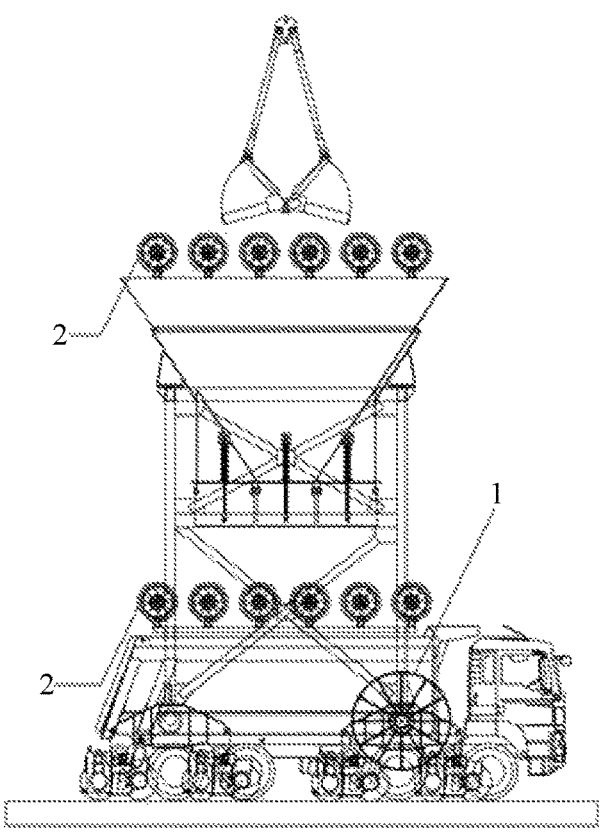
FIG. 4 illustrates the view of the application of the present invention to the bunker loaded with the clamshell bucket.

Bunker Loaded With The Clamshell Bucket: In bunkers loaded with the clamshell bucket shown in detail in FIG. 4, the atomized water spraying fans (2) arranged sequentially on the bunker ensure that the dust rising during the discharge of the raw material into the bunker is suppressed inside the bunker without spreading to the environment, during loading onto vehicles such as trucks, wagons, etc. with the clamshell bucket loader over the bunker. Moreover, atomized water spray fans (2) are placed under the bunker sequentially so as to suppress the dusting rising from the raw material that is poured into the vehicle during raw material loading to be made to the vehicles such as truck, wagon, etc. when the clamp under the bunker opens. Bunkers loaded with clamshell buckets move on the rails or are stationary in areas such as mines, port areas, etc. For this reason, an automatic hose reel (1) or an external water tank is mounted on the bunker so as to supply water constantly to the atomized water spraying fans (2) that will provide dust suppression on and under the bunker. The dust suppression system starts to spray water with automatic up-down and right-left movement angle or with a fixed motion with the sensor placed on the bunker seeing the material or the clamshell, the system can also be operated manually.

The atomized water spray distance of fans and the airflow rate can be adjusted according to the dusting feature of the material by means of the speed control system located above the atomized water spraying fans (2) on and under the bunker in bunkers loaded with clamshell bucket. The fan speed control system allows the spraying distance setting to be the most effective distance setting according to the area where the dust comes out. Water flow rate and pressure can be adjusted with the speed control system and water regulator on the water pump.

The water need of all atomized water spraying fans (2) on bunkers loaded with clamshell bucket is met by the automatic hose reel (1) that provides continuous water to the atomized water spraying fan (2) by automatically opening and collecting the supply hoses installed on the system or an external water tank.

Figure 5:
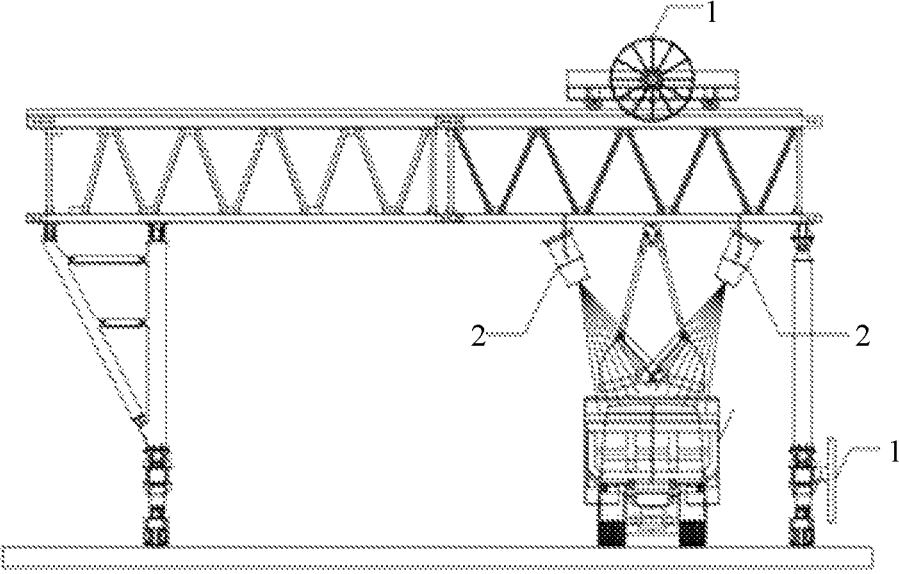
FIG. 5 illustrates the view of the application of the present invention to the clamshell bucket crane.

Clamshell Bucket Cranes: In clamshell bucket cranes shown in detail in FIG. 5, the atomized water spray fans (2) on both sides of the clamshell bucket are designed to suppress the dust rising during the pouring of the raw material in loadings made with vehicles such as the clamshell bucket loader on trucks, wagons and so on. It can be adjusted automatically or manually by means of sensor and software or logic control, according to the pouring height of the material, the movement angle of up-down left-right.

Therefore, the spraying can be adjusted according to the section where the dust comes out.

The atomized water spray distance of fans and the fan airflow rate according to the dusting feature of the material can be adjusted by means of the speed control system located on the atomized water spraying fans (2) on the crane, in clamshell bucket cranes. The fan speed control system allows the spraying distance setting to be the most effective distance setting according to the area where the dust comes out. Water flow rate and pressure can be adjusted with the speed control system and water regulator on the water pump.

The water need of all atomized water spraying fans (2) used in the clamshell bucket cranes is met by the automatic hose reel (1) that provides continuous water to the atomized water spraying fan (2) by automatically opening and collecting the supply hoses installed on the system or an external water tank.

INDUSTRIAL APPLICABILITY OF THE INVENTION

The present invention can be used in all enterprises such as cement factories, iron and steel factories, mine stackpiles, thermal power plants, ports, etc. with a high risk of dust formation and all carrier systems such as conveyor belt, bunker, crane, etc. used during the operations of stacker of raw materials, collection to the process, loading, transportation and so on in open and closed fields so as to suppress the dust at its source and during its spreading to the environment.

The invention claimed is:

1. A smart dust suppression system for use in clamshell or conveyer belt systems of an open mine site or a closed mine site, the smart dust suppression system comprising:

an atomized water spraying fan adapted to spray a water mist toward dust generated by a movement of raw material or by wind at a point where the dust originates;

an electric motor drivingly connected to a conveyor belt that transports the raw material for stacking and recovery of the raw material in association with the clamshell or conveyor belt systems;

at least one movement sensor adapted to calculate a pouring height of the raw material, said at least one movement sensor being cooperative with said atomized water spraying fan such that said atomized water spraying fan moves upwardly and downwardly and moves left to right and vice-versa with a changeable height in order to target a section of the dust;

an electric motor speed control connected to said electric motor and to said atomized water spraying fan so as to automatically or manually adjust a spraying angle or spraying distance of said atomized water spraying fan relative to the pouring height of the material, said electric motor speed control having at least one of a sensor, a software and a logic control;

a material sensor adapted to detect whether the raw material is present on the conveyor belt transporting the raw material so as to activate or deactivate said atomized water spraying fan so as to suppress the dust occurring during transfer of raw material from one point to another on the conveyor belt, wherein said atomized water spraying fan is activated due to high electric current driving said electric motor of a drive drum when the raw material is on the conveyor belt with flow circuit automation operating with flow information received from a feed phase of said electric motor and is deactivated due to a low electric current driving said electric motor when there is no raw material on the conveyor belt; and a current sensor adapted to sense a current draw by said electric motor when driving a drum of the conveyor belt, said current sensor causing said electric motor to drive the drum when said current sensor senses that the current draw is high and for deactivating the electric motor from driving the drum when said current sensor senses that the current draw is low, the current draw being high when the raw material is on the conveyor belt, the current draw being low when there is no raw material on the conveyor belt, wherein the smart dust suppression system is adapted to prevent environmental pollution, protecting human health and for protecting machinery from a dust effect.

2. The smart duct suppression system of claim 1, further comprising:

an automatic hose reel connected to said atomized water spraying fan so as to provide a water supply to said atomized water spraying fan, said automatic hose reel automatically unwinding or winding a supply hose connected thereto.

3. The smart duct suppression system of claim 1, further comprising:

an external water tank positioned so as to supply water to said atomized water spraying fan.

4. The smart duct suppression system of claim 1, further comprising:

a stacking system cooperative with the conveyor belt so as to stack the raw material in a stack area.

5. The smart duct suppression system of claim 4, further comprising:

a raw material reclaimer system that collects the raw material from the stack area and transfers the raw material to a remote location.

6. The smart duct suppression system of claim 4, further comprising:

a bunker having a clamshell bucket so as to load the raw material from the stack area onto a carrier vehicle.

7. The smart duct suppression system of claim 1, wherein said atomized water spraying fan has a fan speed control system that adjusts an air flow rate from said atomized water spraying fan relative to a distance between the raw material and said atomized water spraying fan.

8. The smart duct suppression system of claim 1, further comprising:

a water pump connected to said atomized water spraying fan so as to pass water to said atomized water spraying fan, said water pump having a water speed control system and a water regulator located thereon.

9. The smart duct suppression system of claim 1, wherein said material sensor controls the smart dust suppression system automatically.

10. The smart duct suppression system of claim 1, wherein said material sensor controls the smart dust suppression system manually.

* * * * *